D. C. JACKSON.
DYNAMO ELECTRIC MACHINE.
APPLICATION FILED DEC. 22, 1902.
1,106,514.
Patented Aug. 11, 1914.
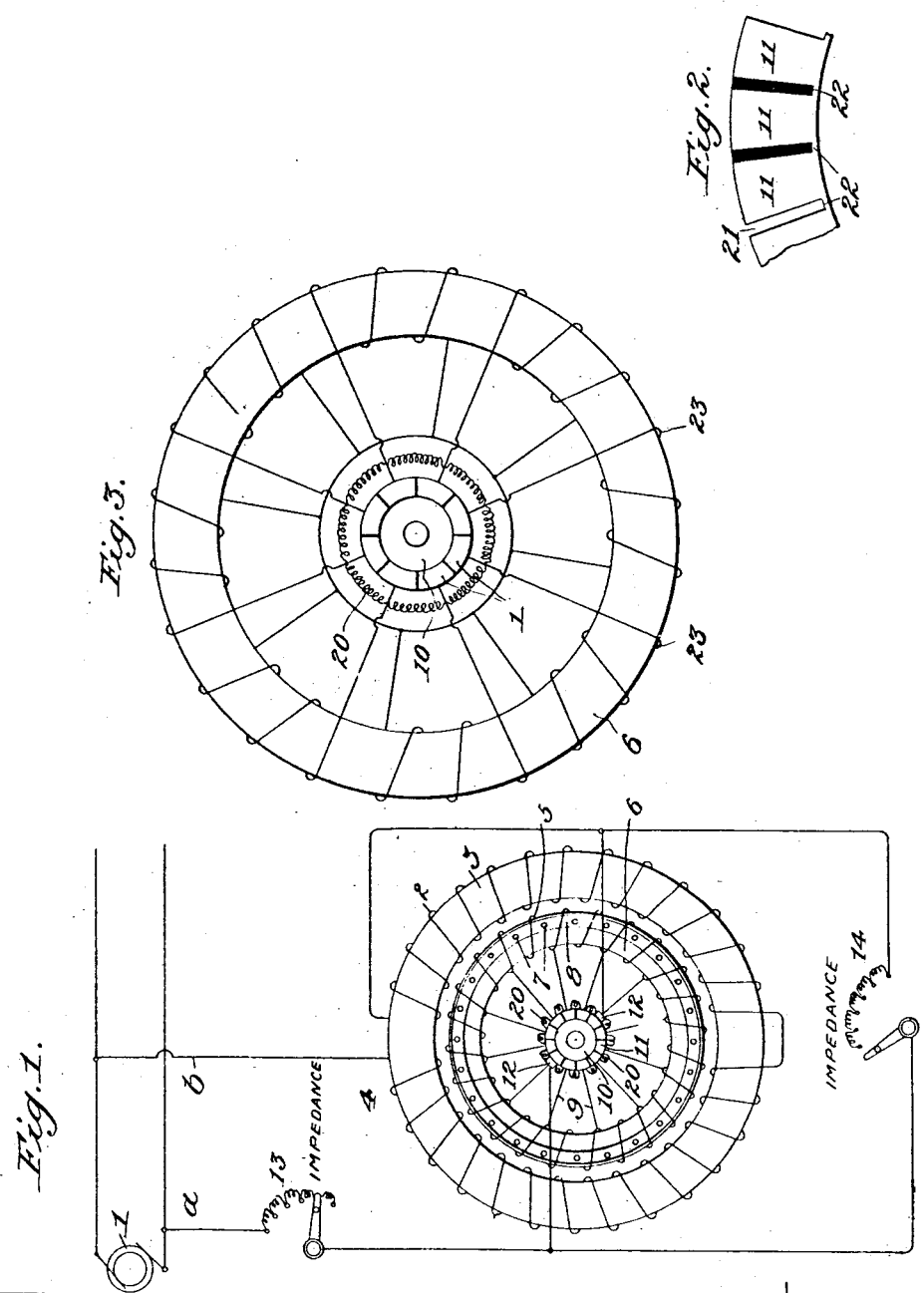

UNITED STATES PATENT OFFICE.

DUGALD C. JACKSON, OF MADISON, WISCONSIN.

DYNAMO-ELECTRIC MACHINE.

1,106,514.　　　　　Specification of Letters Patent.　　Patented Aug. 11, 1914.

Application filed December 22, 1902. Serial No. 136,143.

*To all whom it may concern:*

Be it known that I, DUGALD C. JACKSON, a citizen of the United States, residing at Madison, in the county of Dane and State of Wisconsin, have invented a certain new and useful Improvement in Dynamo-Electric Machines, of which the following is a full, clear, concise, and exact description, reference being had to the accompanying drawings, forming a part of this specification.

My invention relates to dynamo electric machines, and, more particularly, to variable speed alternating current electric machines, and has for its object improved means for controlling such machines and for varying the speed thereof.

Although applicable to electric motors and to generators, I have, for illustration, shown my invention as applied to electric motors and have shown improved means for controlling such motors and for regulating and varying the speed or pressure thereof, especially when such motors are operated as series machines in connection with a constant pressure alternating current circuit, or when connected with such circuit similarly to a direct current shunt motor, the armature circuit and the field circuit being connected in independent branches in shunt of the supply circuit. When such motor is intended for operation as a series machine, I preferably control and vary the speed thereof by introducing into the motor circuit an adjustable impedance. To further control the speed, and also to regulate the torque exerted by the motor, I preferably connect an adjustable impedance in shunt of the brushes. Thus, by a proper adjustment of said impedance, effective and efficient control is obtained. Instead of being directly connected to supply mains, a separate transformer, or an independent secondary of one transformer, may be interposed in each branch. To prevent excessive and injurious sparking, which is likely to occur in connection with a commutator of such a motor as I describe, I preferably electrically connect together the commutator segments.

I have described my invention with reference to single phase electric machines, as it is particularly advantageous when such machines are employed, although it is evident that it may also be effectively employed in connection with polyphase machines and circuits. In connection with polyphase circuits, the fields of the motor should be wound in the usual manner appropriate for the number of phases, and the number of brushes should preferably be equal to the normal number of circuit wires; namely— three brushes for a three-phase circuit, four brushes for a two-phase circuit, and so on, the brushes being properly spaced over the commutator.

This application should be considered in connection with my Patent #870,035 and co-pending application Serial Number 8202, filed March 10, 1900, both of which deal particularly with motors having repulsion motor torque, whereas the present application has special reference to motors to be started with series motor torque.

I shall more clearly describe the nature of my invention with reference to the following diagrams, in which—

Figure 1 is a diagrammatic view of a motor and devices arranged in accordance with my invention, the motor being connected to run as a series motor. Fig. 2 shows a modified commutator construction. Fig. 3 shows a modified form of commutated winding, which may be employed.

Like characters of reference indicate like parts in the several figures.

A source 1 supplies alternating current through conductors $a$ and $b$, to a field winding 2, distributed over a field ring 3 of an alternating current motor 4, and to an armature winding 5, distributed over an armature 6. I also preferably employ upon said armature a short circuited winding, preferably of the squirrel-cage type and consisting of conductors 7, 7, and short circuiting rings 8. The armature winding 5, is preferably connected at intervals by conductors 9, 9 to a commutator 10, consisting of segments 11, 11, and engaged by brushes 12, 12.

I preferably include in the main supply conductor $a$, an adjustable impedance 13, and for the same object and also to regulate the torque, I preferably employ an additional adjustable impedance 14, adapted to be connected in shunt of the brushes 12, 12. Efficient regulation is thus obtained by adjusting the main current supply by means of impedance 13, and by adjusting the current supply through the closed circuit winding 5 on the armature, by means of the shunting impedance 14. The shunting impedance 14 has a direct relation to the extent of induction motor torque produced by the short circuited winding 7, 7, inasmuch as it changes the phase and magnitude of the current through the commutated winding 5, thereby modifying the armature reactions on the magnetic field and the induced currents produced in the short circuited winding.

The word impedance, referring to the adjustable controlling impedances 13, and 14, is used in the broad sense, meaning resistance alone, or reactance alone, or the two used conjointly.

In a motor arranged as described, there is apt to be excessive and injurious sparking, and as a preventive means I connect resistances in bridge between commutator segments. These resistances may be contained in coils 20, for instance, coils of German silver wire, bridged across the segments, as shown in Fig. 1, but as an alternative means for obtaining such resistance effect, I employ a commutator of modified construction, as shown in Fig. 2. A core is slitted to form suitable segments, the slits 21 being cut to within a thin section 22 of completion, such thin section containing the resistance necessary to prevent undue sparking between adjacent commutator segments. The commutator thus forms a continuous closed conductor. The slits may be filled up with insulating material, or may be made complete and filled up with some high resistance material to accomplish the same result as the thin section 22. Besides being a preventive means for sparking, these bridging resistances between segments give the commutated winding 5 the effect of a short-circuited winding.

In Fig. 3 I have shown a modified form of commutated armature winding, having open coils 23 connected star fashion, as shown. Any other suitable windings might also be employed.

Having thus described my invention, I claim as new, and desire to secure by Letters Patent:—

1. In an alternating current motor the combination with a field winding, of a commutated armature circuit included in series therewith, and a plurality of resistances bridging coils of said armature circuit, substantially as described.

2. In an alternating current motor the combination with a field winding, of an armature provided with a normally short-circuited winding, and with a commutated winding adapted for inclusion in series with said field winding, a plurality of resistances bridging coils of said commutated winding, and means for varying the current through said commutated winding, substantially as described.

3. In an alternating current motor, the combination with a field winding, of a commutated armature circuit included in series therewith, a plurality of conducting branches, bridging coils of said armature circuit, and variable impedance adapted for inclusion in parallel with the commutated circuit, substantially as described.

4. In an alternating current motor, the combination with a field winding, of an armature provided with a normally short-circuited winding, and with a commutated winding adapted for inclusion in circuit in series with said field winding, a plurality of conducting branches bridging coils of said commutated winding, and means for varying the current in said field winding, substantially as described.

5. In an alternating current dynamo electric machine, the combination with a field winding, of a source of alternating current, a commutated armature winding connected in series with said source and with said field winding, a segmented commutator to which said winding is connected at suitable intervals in order to produce series motor torque, and means for electrically bridging segments of said commutator.

6. In an alternating current dynamo electric machine, the combination with a field winding, of a source of alternating current, an armature winding short circuited on itself to produce induction motor torque, an auxiliary commutated armature winding connected in series with said source and with said field winding, a segmented commutator to which said commutated winding is connected at suitable intervals to produce series motor torque, and means for electrically bridging segments of said commutator.

7. The combination with a source of alternating currents, of a motor receiving current from said source, means for varying said current, a field winding for said motor, an armature for said motor provided with a short circuited winding and with a commutated winding, the commutated circuit being included in series with said field winding, impedance in parallel circuit with the commutated circuit, and means for varying said impedance.

In witness whereof, I hereunto subscribe my name this seventeenth day of December A. D., 1902.

DUGALD C. JACKSON.

Witnesses:
Lynn A. Williams,
Harvey L. Hanson.

Copies of this patent may be obtained for five cents each, by addressing the "Commissioner of Patents, Washington, D. C."